United States Patent
Kuruma

(10) Patent No.: US 7,606,481 B2
(45) Date of Patent: Oct. 20, 2009

(54) IMAGE PICKUP APPARATUS AND FLASH UNIT AND METHOD OF CONTROLLING THE SAME

(75) Inventor: Daisuke Kuruma, Tokyo (JP)

(73) Assignee: Sony Corporation, Tokyo (JP)

( * ) Notice: Subject to any disclaimer, the term of this patent is extended or adjusted under 35 U.S.C. 154(b) by 226 days.

(21) Appl. No.: 11/294,374

(22) Filed: Dec. 6, 2005

(65) Prior Publication Data

US 2006/0140616 A1 Jun. 29, 2006

(30) Foreign Application Priority Data

Dec. 10, 2004 (JP) ............................ P2004-357998

(51) Int. Cl.
*G03B 15/03* (2006.01)
(52) U.S. Cl. ...................... 396/165; 396/177
(58) Field of Classification Search ................. 396/177, 396/165, 166, 155, 179, 543, 176, 178; 348/370, 348/371
See application file for complete search history.

(56) References Cited

U.S. PATENT DOCUMENTS

| | | | |
|---|---|---|---|
| 4,366,501 A * | 12/1982 | Tsunekawa et al. ......... 386/118 |
| 4,618,238 A * | 10/1986 | Maitani et al. .............. 396/223 |
| 5,233,378 A | 8/1993 | Hosokawa et al. |
| 5,521,664 A * | 5/1996 | Tsukahara et al. .......... 396/165 |
| 5,550,611 A * | 8/1996 | Ishida et al. .................. 396/48 |
| 6,389,233 B2 * | 5/2002 | Kawando ..................... 396/177 |
| 6,427,051 B1 * | 7/2002 | Hosokawa et al. .......... 396/165 |
| 6,582,240 B2 * | 6/2003 | Suto ............................. 439/79 |
| 6,724,987 B2 * | 4/2004 | Hata et al. ................... 396/161 |
| 6,724,988 B2 * | 4/2004 | Mikami ....................... 396/161 |
| 6,958,779 B2 * | 10/2005 | Kubo .......................... 348/371 |
| 7,321,395 B2 | 1/2008 | Gotanda |
| 2002/0028072 A1 * | 3/2002 | Kashiyama ................. 396/106 |
| 2004/0095505 A1 * | 5/2004 | Gotanda ..................... 348/370 |
| 2004/0189821 A1 * | 9/2004 | Oda et al. ................. 348/223.1 |
| 2006/0072916 A1 * | 4/2006 | Liu ............................. 396/177 |

FOREIGN PATENT DOCUMENTS

| | | | |
|---|---|---|---|
| JP | 02093526 A | * | 4/1990 |
| JP | A-05-43138 | | 2/1993 |
| JP | U-05-43138 | | 6/1993 |
| JP | 2002-072303 | | 3/2002 |
| JP | A-2002-072303 | | 3/2002 |
| JP | 2004-157417 | | 6/2004 |

OTHER PUBLICATIONS

English translation of Japanese Laid Open Utility Model application JP-U-05-43138 (19 pgs).

* cited by examiner

*Primary Examiner*—Jay Patidar
*Assistant Examiner*—David M. Schindler
(74) *Attorney, Agent, or Firm*—Finnegan, Henderson, Farabow, Garrett & Dunner LLP

(57) ABSTRACT

An image pickup apparatus having a flash unit locating at a storing position or a projecting position, in which either an automatic mode to automatically move the flash unit from the storing position to the projecting position or a manual mode to manually execute the operation can be set. The apparatus includes a first operating unit which selects either the automatic mode or the manual mode and a second operating unit which moves the flash unit from the storing position to the projecting position when the manual mode is selected by the first operating unit. The first and second operating units are provided in close positions.

16 Claims, 12 Drawing Sheets

Fig. 6

| SETTING OF POP-UP | OPERATION OF EXTERNAL KEY | |
|---|---|---|
| | OPERATION OF SWITCH BUTTON | PRESS SWITCH BUTTON FOR A LONG TIME + OPERATE COMMAND DIAL |
| POP-UP AUTO | (1) FLASH IS LOCATED IN PROJECTING POSITION | (5) FLASH IS LOCATED IN PROJECTING POSITION |
| | FLASH DOES NOT OPERATE EVEN IF BUTTON IS PRESSED | CHANGE LIGHT EMITTING MODE |
| | (2) FLASH IS LOCATED IN STORING POSITION | (6) FLASH IS LOCATED IN STORING POSITION |
| | FLASH DOES NOT OPERATE EVEN IF BUTTON IS PRESSED | CHANGE LIGHT EMITTING MODE |
| POP-UP MANUAL | (3) FLASH IS LOCATED IN PROJECTING POSITION | (7) FLASH IS LOCATED IN PROJECTING POSITION |
| | FLASH DOES NOT OPERATE EVEN IF BUTTON IS PRESSED | CHANGE LIGHT EMITTING MODE |
| | (4) FLASH IS LOCATED IN STORING POSITION | (8) FLASH IS LOCATED IN STORING POSITION |
| | FLASH IS POPPED UP | FLASH IS POPPED UP AND LIGHT EMITTING MODE CAN BE CHANGED |

Fig. 7

| POP-UP | | LIGHT EMITTING MODE | G | P | A | S | M | PORTRAIT | SCENERY | NIGHT VIEW + PERSON | NIGHT VIEW |
|---|---|---|---|---|---|---|---|---|---|---|---|
| AUTO | ① | AUTO (LEADING CURTAIN) | ○ | ○ | × | × | × | ○ | × | × | × |
| | ② | AUTO RED-EYE (LEADING CURTAIN) | ○ | ○ | × | × | × | ○ | × | × | × |
| | ③ | INHIBIT | ○ | ○ | ○ | ○ | ○ | ○ | ○ | × | ○ |
| | ④ | FORCED LIGHT EMISSION (LEADING CURTAIN) | × | ○ | ○ | ○ | ○ | ○ | × | × | × |
| | ⑤ | FORCED LIGHT EMISSION RED-EYE (LEADING CURTAIN) | × | ○ | ○ | ○ | ○ | ○ | × | × | × |
| | ⑥ | FORCED LIGHT EMISSION TRAILING CURTAIN | × | × | × | × | ○ | × | × | × | × |
| | ⑦ | FORCED SLOW SYNCHRO (LEADING CURTAIN) | × | ○ | ○ | × | × | × | × | ○ | × |
| | ⑧ | FORCED SLOW SYNCHRO RED-EYE (LEADING CURTAIN) | × | ○ | ○ | × | × | × | × | ○ | × |
| | ⑨ | FORCED SLOW SYNCHRO TRAILING CURTAIN | × | ○ | ○ | × | × | × | × | × | × |
| MANUAL | ⑪ | LIGHT EMISSION (LEADING CURTAIN) | ○ | ○ | ○ | ○ | ○ | ○ | × | × | × |
| | ⑫ | LIGHT EMISSION RED-EYE (LEADING CURTAIN) | ○ | ○ | ○ | ○ | ○ | ○ | × | × | × |
| | ⑬ | LIGHT EMISSION TRAILING CURTAIN | × | × | × | × | ○ | × | × | × | × |
| | ⑭ | SLOW SYNCHRO LEADING CURTAIN | × | ○ | ○ | × | × | × | × | × | × |
| | ⑮ | SLOW SYNCHRO LEADING CURTAIN RED-EYE | × | ○ | ○ | × | × | × | × | ○ | × |
| | ⑯ | SLOW SYNCHRO TRAILING CURTAIN | × | ○ | ○ | × | × | × | × | ○ | × |

IMAGE PICKUP APPARATUS AND FLASH UNIT AND METHOD OF CONTROLLING THE SAME

CROSS REFERENCES TO RELATED APPLICATIONS

The present invention contains subject matter related to Japanese Patent Application JP 2004-357998 filed in the Japanese Patent Office on Dec. 10, 2004, the entire contents of which being incorporated herein by reference.

BACKGROUND OF THE INVENTION

1. Field of the Invention

The invention relates to an image pickup apparatus and a control method of the image pickup apparatus.

2. Description of the Related Arts

A flash equipped for a digital camera which has been widespread in recent years has various light emitting modes. For example, besides a forced light emitting mode and a light emission inhibiting mode, there are a red-eye reducing mode to prevent the eyes of an object from becoming red, a light emitting mode called a slow synchro (synchronizing) mode using both of a slow shutter and a flash, and the like.

Movement from a storing position to a projecting position of the flash (hereinafter, properly referred to as "pop-up") is performed by selecting an auto (automatic) mode or a manual mode. That is, when the auto mode is selected, the camera automatically detects necessity of the flash. When the flash is necessary, the flash is automatically popped up and emits light, thereby photographing the object. When the manual mode is selected, the flash is popped up by operating a switch or the like equipped for the camera.

The invention regarding a camera having a button in which pop-up means of a flash and mode switching means are integrated has been disclosed in JP-U-05-43138.

The invention regarding a camera in which pop-up means of a flash and means which is set into a mode switching state are constructed as a same button and a mode switching is performed by operating a command dial while pressing a flash button has been disclosed in JP-A-2002-72303.

OBJECTS AND SUMMARY OF THE INVENTION

However, the foregoing related arts have the following problems. In the invention disclosed in JP-A-05-43138, the operating mode is switched to the flash mode by pressing the flash button. Therefore, when there are many light emitting modes of the flash, the flash button has to be pressed many times in order to switch the light emitting modes, so that the operation is troublesome.

According to the camera disclosed in JP-A-2002-72303, in the automatic exposure (AE) mode, even if the flash button is pressed, the flash is not popped up (for example, refer to FIGS. 5A and 5B). However, if the setting of the pop-up of the flash is made to depend on the exposure mode, the setting of the pop-up is determined by the selection of the exposure mode. There is, consequently, a fear that it is difficult for the user to set the desired pop-up.

Since the setting of the flash is a popular setting to the user of the camera, a construction of a camera in which the user can easily understand a setting method is demanded. So long as a camera in which the user can easily understand the setting of the flash is used, even in the case where the user temporarily lends the camera to another person and requests him to photograph, or the like, the user can easily explain the setting of the flash to the photographer and a failure in photographing due to a setting mistake of the pop-up of the flash can be prevented.

It is, therefore, desirable to provide an image pickup apparatus in which the setting operation regarding a flash can be easily executed and to provide a control method of the image pickup apparatus.

According to an embodiment of the present invention, there is provided an image pickup apparatus having a flash unit locating at a storing position or a projecting position, in which either an automatic mode to automatically move the flash unit from the storing position to the projecting position or a manual mode to manually execute an operation can be set, comprising:

a first operating unit selecting either the automatic mode or the manual mode; and a second operating unit moving the flash unit from the storing position to the projecting position when the manual mode is selected by the first operating unit, wherein the first operating unit and the second operating unit are provided in close positions.

According to another embodiment of the invention, there is provided an image pickup apparatus having a flash unit locating at a storing position or a projecting position, in which either an automatic mode to automatically move the flash unit from the storing position to the projecting position or a manual mode to manually execute an operation can be set, comprising:

an operating unit having a first function to select either the automatic mode or the manual mode and a second function to move the flash unit from the storing position to the projecting position when the manual mode is selected.

According to further another embodiment of the invention, there is provided a control method of an image pickup apparatus in which either an automatic mode to automatically move a flash unit from a storing position to a projecting position or a manual mode to manually execute an operation can be set, comprising:

a selecting step of selecting by a first operation whether the movement of the flash unit from the storing position to the projecting position is executed in the automatic mode or in the manual mode; and a moving step of moving the flash unit from the storing position to the projecting position by a second operation when the manual mode is selected in the selecting step.

According to the invention, since the setting regarding the pop-up of the flash and the pop-up operation can be executed by the operating unit locating in the same position or only by the operating unit locating in the close position, the operability is improved. Further, by using the operating unit such as a command dial or the like, the setting regarding the function of the flash can be also executed and the setting regarding the flash can be concentratedly executed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram showing an operation example of the digital camera corresponding to the setting of the pop-up;

FIG. 7 is a diagram showing a light emitting mode which can be selected in each photographing mode;

DETAILED DESCRIPTION OF THE PREFERRED EMBODIMENT

An embodiment of the invention will be described hereinbelow with reference to the drawings. The embodiment will be described with respect to the case of using a digital camera 1 as an example of an image pickup apparatus. The digital camera 1 can be set to either the automatic mode or the manual mode as an operation of the pop-up of the flash (hereinafter, properly referred to as a pop-up mode). A light emitting mode and a light adjusting mode can be set as functions of the flash (hereinafter, properly referred to as a flash mode) other than the pop-up mode. Further, a photographing mode such as exposure control, scene selecting function, or the like can be set.

Figure 1:
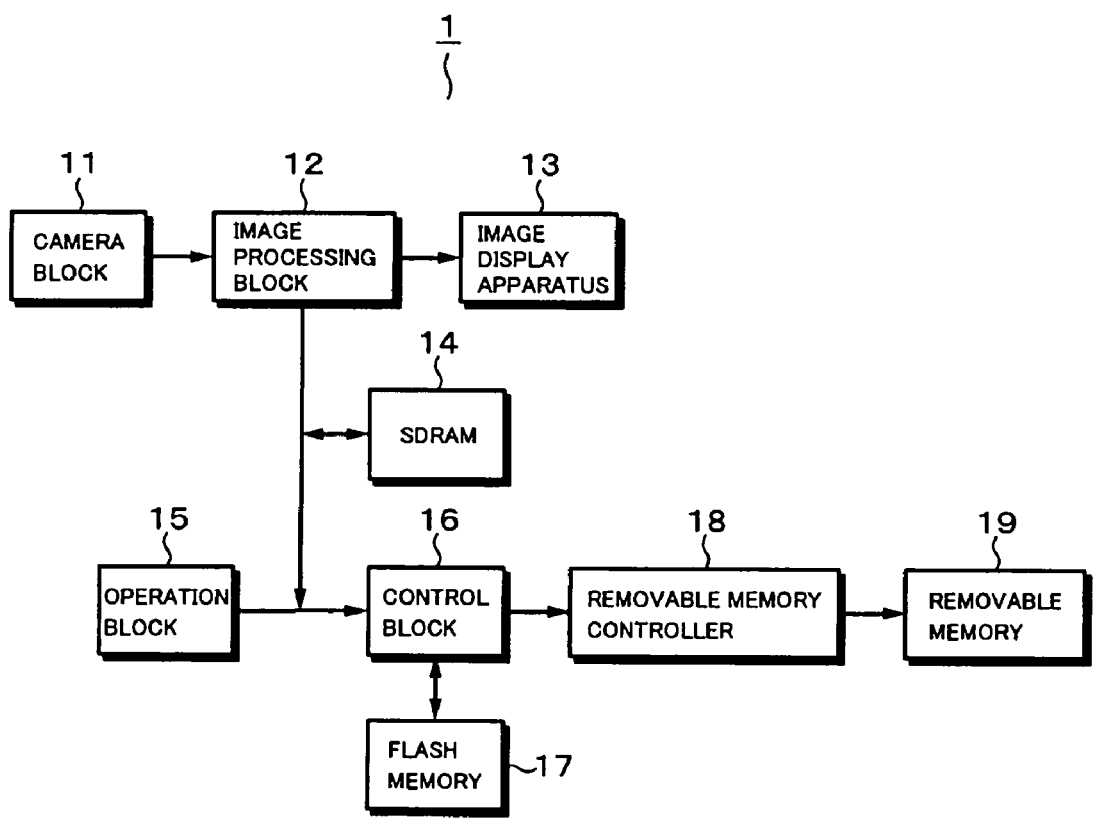
FIG. 1 is a block diagram showing a construction of a digital camera according to an embodiment of the invention.

FIG. 1 shows a main construction of a signal processing system of the digital camera 1. The digital camera 1 includes: a camera block 11; an image processing block 12; an image display apparatus 13; an SDRAM (Synchronous Dynamic Random Access Memory) 14; an operation block 15; a control block 16; a flash memory 17; a removable remote controller 18; and a removable memory 19.

The camera block 11 is constructed by, for example, an optical system, an image sensor, an analog signal processing unit, and a timing generating unit. The optical system is constructed by, for example, a lens system to form an object image onto the image sensor, an infrared removing filter to remove infrared rays, an optical low pass filter, and the like.

For example, an image pickup device such as CCD (Charge Coupled Device), CMOS (Complementary Metal Oxide Semiconductor), or the like is used as an image sensor. In the image sensor, photoelectric conversion according to a light amount of incident light is executed. Object information is outputted from the image sensor as an electric image pickup signal.

In the analog signal processing unit, various signal processes are executed to the image pickup signal which is outputted from the image sensor such as a CCD or the like. The analog signal processing unit includes, for example: a CDS (Correlated Double Sampling) unit to remove noises included in the image pickup signal outputted from the image sensor; and an AGC (Automatic Gain Control) unit to control a gain in accordance with a signal amount.

The timing generating unit is constructed by a TG (Timing Generator) to generate drive pulses for driving the image sensor and a driver unit.

The photographing signal which is outputted from the camera block 11 is converted into a digital signal by an A/D (Analog to Digital) unit (not shown) and supplied to the image processing block 12.

In the image processing block 12, various signal processes are executed to the image pickup signal which is supplied. For example, a white balance process, an interpolating process, a gradation correcting process, and the like are executed. The signal-processed image pickup signal is transmitted through a matrix circuit and outputted as primary color signals (RGB signals) and YUV signals from the image processing block 12.

The signals which are outputted from the image processing block 12 are supplied to the image display apparatus 13. The image display apparatus 13 is a general denomination of, for example, an LCD (Liquid Crystal Display) panel and a view finder (hereinafter, properly referred to as an EVF (Electric View Finder)) which are provided for the digital camera 1. The user photographs an object while confirming a video image of the object displayed on the LCD panel or the EVF.

The video signal which is outputted from the image processing block 12 is temporarily recorded into the SDRAM 14 or recorded into the removable memory 19 which is detachable from the digital camera 1. The data which is recorded into the removable memory 19 is converted into a format suitable for the recording into the removable memory 19 by the removable memory controller 18 and recorded. For example, a memory card, an optical disk, a magnetooptic disk, or the like is used as a removable memory 19.

The control of each block as mentioned above is made by the control block 16. That is, the control block 16 executes the programs stored in the flash memory 17, so that each block is controlled.

The operation block 15 is a general denomination of switches and operation keys provided for the digital camera 1. When the operation block 15 is executed, a signal formed in correspondence to the operation is supplied to the control block 16. The control block 16 analyzes the supplied signal and executes a process corresponding to the operation.

Figure 2:
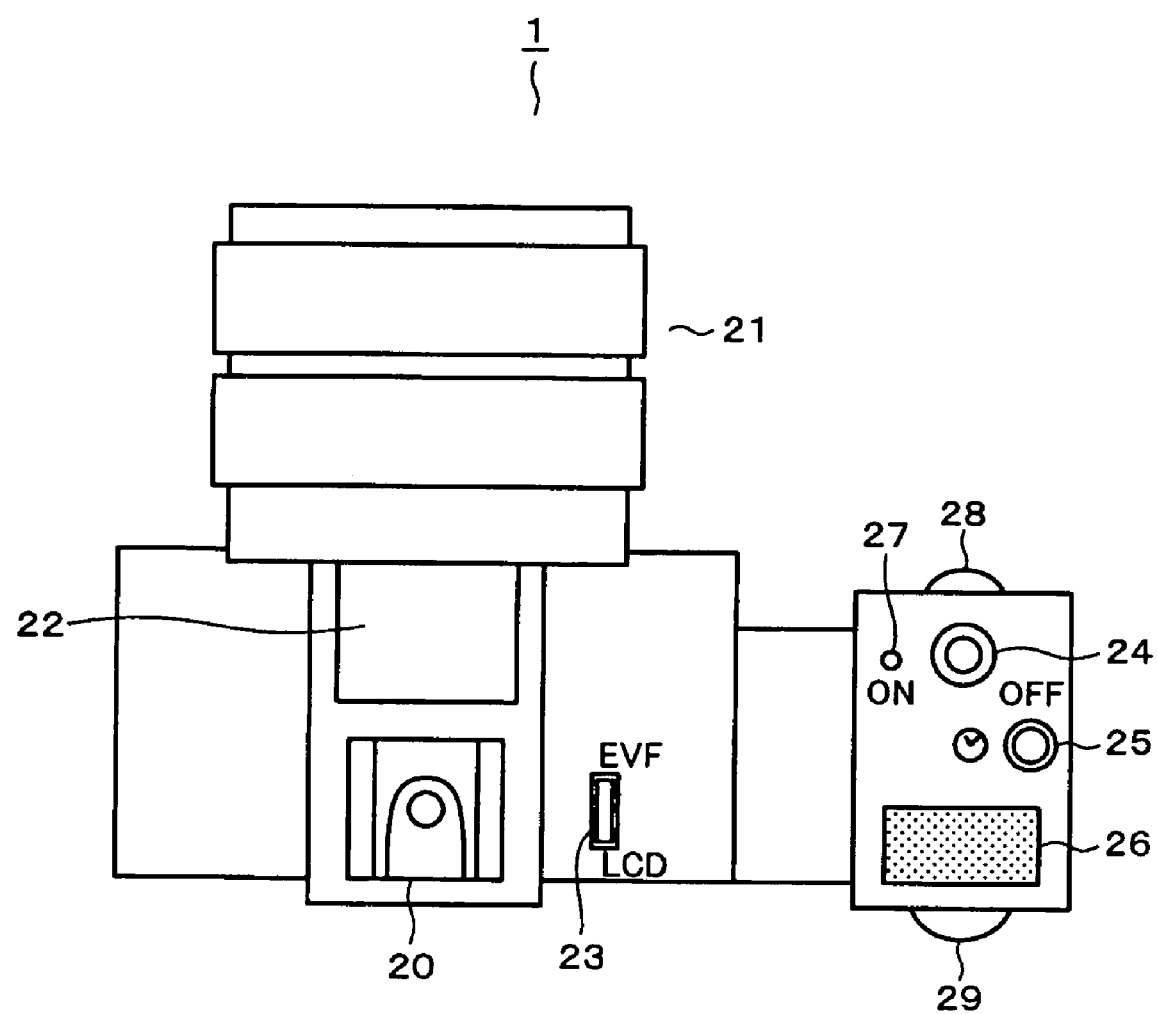
FIG. 2 is a schematic diagram showing a top view of the digital camera in the embodiment of the invention.

An example of an external view of the digital camera 1 in the embodiment will now be described with reference to FIGS. 2 to 4. FIG. 2 shows a top view of the digital camera 1. Reference numeral 21 denotes an optical system apparatus mainly including a lens.

Reference numeral 22 denotes a flash unit (hereinafter, simply referred to as a flash). Ordinarily, when the flash is not used, the flash 22 is stored in (storing position) a casing of the digital camera 1. When the flash is used, the flash 22 is popped up from the storing position to the projecting position and emits the light upon photographing.

According to the digital camera 1 in the embodiment, in the case where the automatic mode is selected, when the object is in-focused, the necessity of the light emission of the flash 22 is detected. If the light emission is necessary, the flash 22 is automatically popped up and emits light upon photographing. If the light emission is unnecessary, the flash 22 is held in the storing position. If the flash 22 is located in the projecting position, when the object is in-focused, the necessity of the light emission of the flash 22 is detected. If the light emission is unnecessary, the flash 22 does not emit the light. If the light emission is necessary, the flash 22 emits light.

When the manual mode is selected, the pop-up of the flash 22 is executed in response to the operation of the user. That is, when the user uses the flash 22, he instructs the pop-up operation by executing a predetermined operation. When the flash 22 is not used, the flash 22 is stored in the storing position from the projecting position manually or by the switching operation.

The following component elements are provided on the upper surface of the digital camera 1: a hot shoe 20 adapted to attach an external stroboscope; a change-over switch 23 for switching use of the EVF and use of the LCD panel provided on the rear surface; a shutter button 24; a self timer button 25; and a character LCD panel 26. The shutter button 24 can be pressed at two levels. When the shutter button 24 is in what is called a "semi-press" state, an automatic focusing function and automatic exposure control are executed. When the shutter button 24 is in a "full-press" state, the photographing is executed. A function of a power switch is also added to the shutter button 24. An LED (Light Emitting Diode) 27 to show that a power source of the digital camera 1 is ON is provided.

Reference numerals 28 and 29 denote command dials. Each of the command dials 28 and 29 can be rotated to the right and left. Although the digital camera 1 of the embodiment has a construction in which the two command dials are provided, only either of them may be provided.

Figure 3:
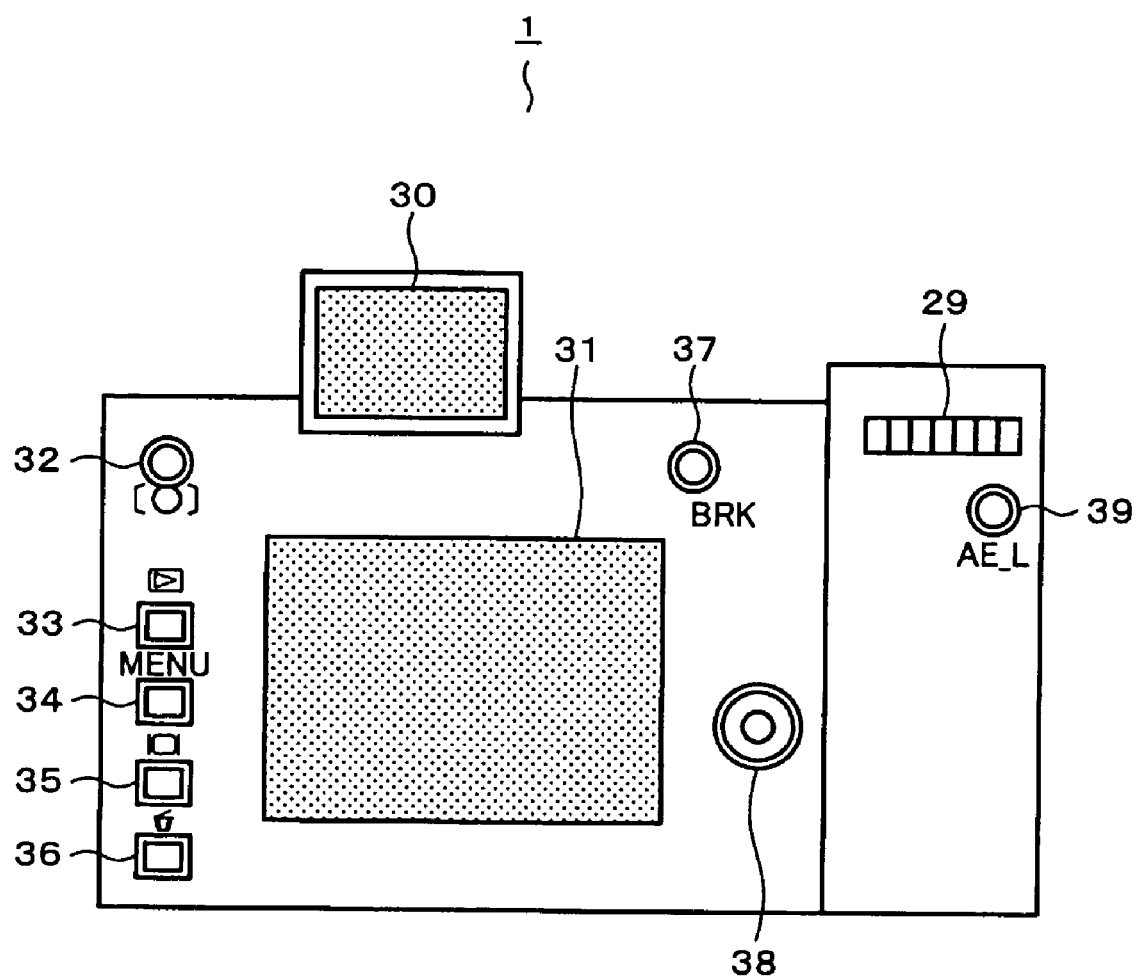
FIG. 3 is a schematic diagram showing a rear view of the digital camera in the embodiment of the invention.

FIG. 3 shows a rear view of the digital camera 1. An EVF 30 to display the object and an LCD panel 31 to display the object, a menu on which various settings are made, or the like are provided on the rear surface. The following buttons are also provided: a photometric mode button 32 to decide a photometric mode; a reproducing button 33 to reproduce image data recorded in an internal memory or an external memory; a menu button 34 to display the menu onto the LCD panel 31; a change-over button 35 to switch the display contents on the LCD panel 31; and a delete button 36 to delete arbitrary image data.

Further, the following component elements are also provided on the rear surface of the digital camera 1: a bracket button 37 to select and execute an automatic bracket function or a continuous photographing function to continuously photograph a plurality of images of the object while shifting the exposure; a joystick 38 which is movable in the crossing direction; the command dial 29; and an AE (Auto Exposure) lock button 39. The joystick 38 may be used as a direction instructing key in the crossing direction.

It is also possible to construct the LCD panel 31 as a touch panel and execute the function of each of the foregoing switches by pressing the LCD panel.

Figure 4:
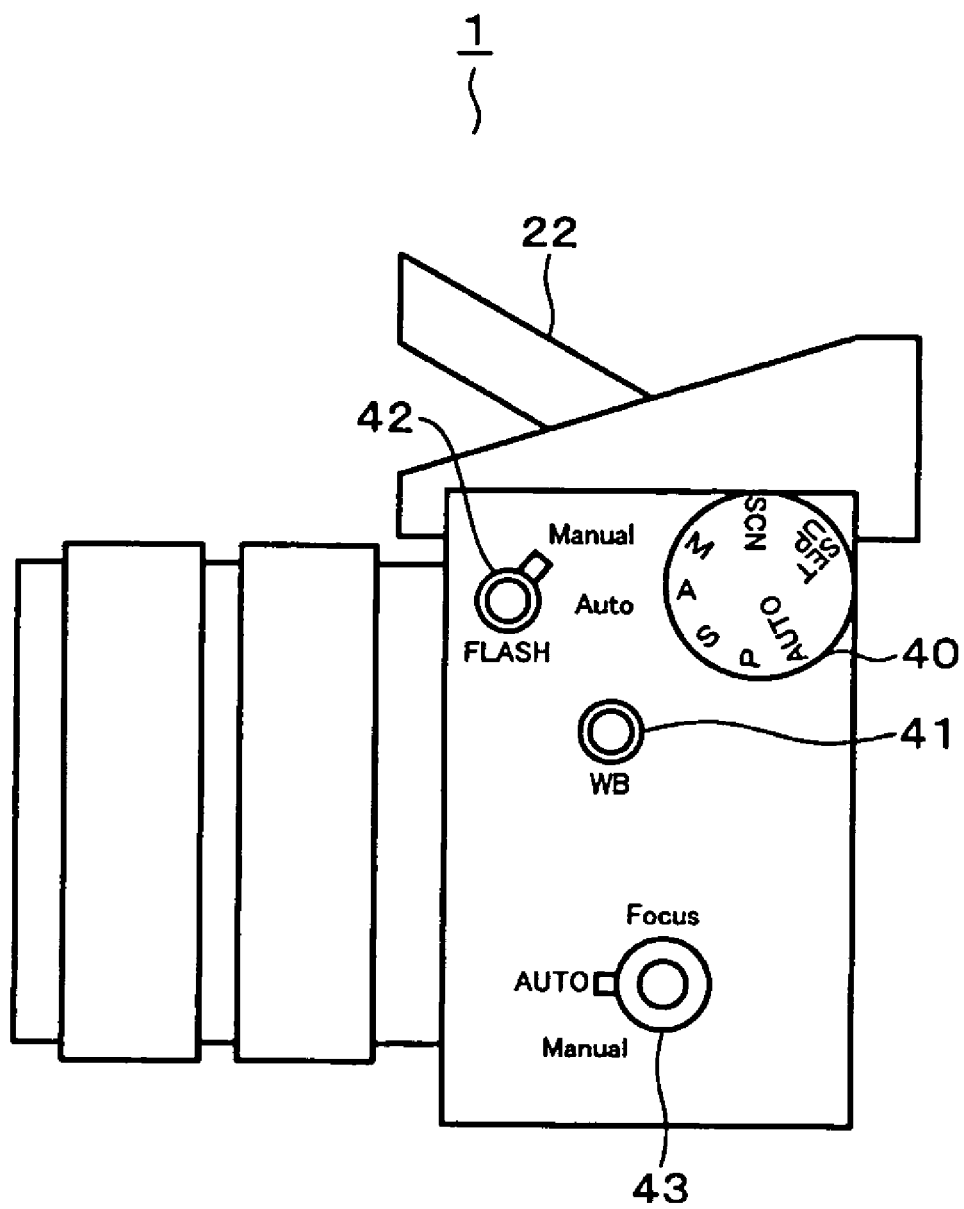
FIG. 4 is a schematic diagram showing a left side elevational view of the digital camera in the embodiment of the invention.

FIG. 4 shows a left side elevational view of the digital camera 1. The following component elements are provided on the left side surface: a mode dial 40; a white balance setting button 41; a focusing switch 43 for selecting either a mode to automatically decide the focusing or a mode to manually decide it; and a flash selecting switch 42.

The mode dial 40 is rotatable. By rotating the mode dial 40, a user's desired photographing mode can be decided. As a photographing mode, he can select a desired one of the following modes: an automatic mode; a P mode (program auto mode); an S mode (shutter speed-priority mode); an A (aperture-priority mode); an M mode (manual mode); an SCN mode (scene selection mode); and a set-up mode. The display of the mode dial 40 may be realized by icons or the like. For example, the automatic mode may be displayed by a symbol mark of the camera in green.

Hitherto, the setting of the pop-up mode depended on the photographing mode selected by the mode dial 40. That is, when the automatic mode is selected by rotating the mode dial 40, the pop-up mode is set to the automatic mode, and the mode dial 40 is selected to, for example, one of the P, S, A, and M modes, the pop-up mode is set to the manual mode.

Since the pop-up mode is determined by the photographing mode as mentioned above, for example, it is difficult to execute such an operation that the mode dial 40 is set to the S mode, the pop-up mode is set to the automatic mode, and the object is photographed.

To prevent such a problem, therefore, according to the invention, the flash selecting switch 42 which can select the pop-up mode and further instruct the pop-up operation is provided for the digital camera 1.

Figure 5A:
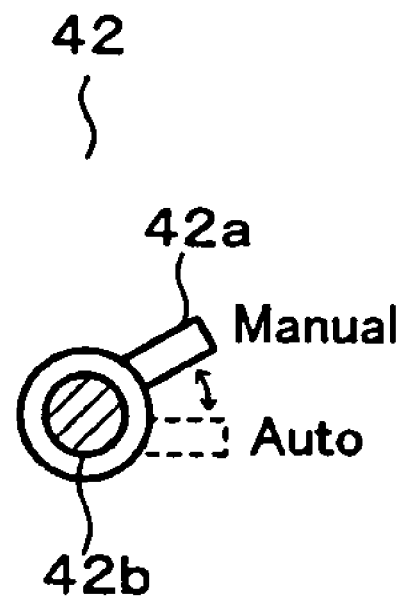
FIGS. 5A and 5B are schematic diagrams showing a flash selecting button in the embodiment of the invention and its modification.

FIG. 5A shows an example of the flash selecting switch 42 of the embodiment. The flash selecting switch 42 includes: a slide switch 42a (first operating unit) to select the pop-up mode; and a switch button 42b (second operating unit) to pop up the flash 22 when the slide switch 42a is set to the manual side. The switch button 42b has, for example, an almost circular shape and is a push button switch which can be pressed.

The slide switch 42a and the switch button 42b are provided in the close positions. By locating them in the close positions, the operations of the slide switch 42a and the switch button 42b can be also successively executed, so that the operability is improved.

Further, according to the digital camera 1 in the embodiment, by using the command dial as an example of the third operating unit, not only the pop-up but also the flash mode can be set.

Specifically speaking, by rotating the command dial 28 while pressing the switch button 42b, the light emitting mode of the flash can be selected. The light emitting mode is changed by rotating the command dial 28 while pressing the switch button 42b. When the command dial 28 is rotated, the icons and characters displayed on the EVF 30, LCD 31, and character LCD panel 26 are sequentially changed. By stopping the rotation of the command dial 28 when the icon or characters showing the desired light emitting mode are displayed, the light emitting mode is selected.

By operating the command dial 29 while pressing the switch button 42b, the light adjusting level of the flash 22 can beset. By rotating the command dial 29 while pressing the switch button 42b, the light adjusting level can be selected by a step of ⅓ Ev (Exposure Value) or ½ Ev. By stopping the rotation of the command dial 29 when a desired value is displayed, a light emission amount of an under level or an over level can be set by a step of ⅓ Ev or ½ Ev.

Figure 5B:
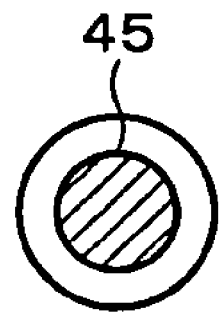

FIG. 5B shows a flash selecting switch button 45 as a modification of the flash selecting switch 42. The flash selecting switch button 45 is, for example, a push button switch which can be pressed.

The flash selecting switch button 45 has first and second functions. The first function is a function to select one of the pop-up modes. The second function is a function to pop up the flash 22 from the storing position to the projecting position.

By continuously pressing the flash selecting switch button 45 (hereinbelow, properly abbreviated to a switch button 45) for a predetermined time such as ten seconds, the pop-up modes are switched. The pop-up modes may be displayed onto, for example, the character LCD panel 26 or the LCD panel 31.

When the pop-up mode is the manual mode, by pressing the switch button 45 for a short time such as one second, the flash is popped up.

The light emitting mode of the flash 22 can be selected by rotating the command dial 28 as another operating unit while pressing the switch button 45. By rotating the command dial 29 as another operating unit while pressing the switch button 45, the light adjusting level of the flash 22 can be set.

Further, since the switching operation of the pop-up modes of the flash 22 is not frequently executed, the desired pop-up mode may be set when a power source is ON. For example, the pop-up modes may be switched by turning on the power source of the digital camera 1 while pressing the switch button 45 and, further, continuously pressing it for a predetermined time. The predetermined time is set to, for example, five seconds.

As mentioned above, according to the invention, the pop-up mode of the flash can be set by operating the flash selecting switch. By operating the switch arranged in the same position as that of the flash selecting switch or in the close position when the pop-up mode is the manual mode, the pop-up operation can be instructed. Further, by using the command dial in common, the flash mode can be set. That is, the operability is improved by making the various settings regarding the flash only by operating the flash selecting switch and the command dial.

FIG. 6 shows an example of the operation of the digital camera 1 corresponding to the operation of the flash selecting switch 42. The pop-up mode is set by the slide switch 42a. First, an example of the operation corresponding to the pressing operation of the switch button 42b will be described.

As shown in patterns (1) and (2) in FIG. 6, the pop-up mode is set to the automatic mode and even if the switch button 42b is pressed, the flash 22 does not operate irrespective of the projecting position or the storing position of the flash 22.

As shown in a pattern (3), the pop-up mode is set to the manual mode and even if the switch button 42b is pressed when the flash 22 is located in the projecting position, since the flash 22 has already existed in the projecting position, the flash 22 does not operate. As shown in a pattern (4), the pop-up mode is set to the manual mode and if the switch button 42b is pressed when the flash 22 is located in the storing position, the flash 22 is popped up.

When the switch button 42b is pressed, if the flash 22 does not operate at all as shown in, for example, patterns (1) and (2), there is also a fear that the user misunderstands that the digital camera 1 has failed. To prevent such a problem, feedback information showing that the pressing operation of the switch button 42b has been performed may be displayed on the EVF 30 or LCD 31. The pop-up mode which is selected at present or information showing that the operation of the switch button 42b is invalid may be also displayed on the EVF 30 or LCD 31.

An example of the operation of the digital camera 1 when the command dial 28 is operated while pressing the switch button 42b will now be described. As shown in patterns (5) and (6) in FIG. 6, the pop-up mode is set to the automatic mode and if the command dial 28 is operated while pressing the switch button 42b, the light emitting mode can be changed irrespective of the position of the flash 22.

As shown in pattern (7), the pop-up mode is set to the manual mode and if the command dial 28 is operated while pressing the switch button 42b when the flash is in the projecting position, the light emitting mode can be changed.

As shown in pattern (8), the pop-up mode is set to the manual mode and if the command dial 28 is operated while pressing the switch button 42b when the flash is in the storing position, the flash 22 is popped up and the light emitting mode can be further changed.

Although the example of the operation of the digital camera 1 shown in FIG. 6 has been described by using the switch button 42b, similar operations are also executed by the operation of the switch button 45.

FIG. 7 shows an example of the light emitting mode which can be selected in each photographing mode. As photographing modes shown in FIG. 7, the following nine modes can be selected: a G mode showing "full auto"; the foregoing modes P, A, S, and M; and scene selection modes such as portrait, scenery, night view & person, and night view. In FIG. 7, ○ denotes that the relevant mode can be selected and × denotes that the relevant mode cannot be selected.

For example, when the S mode is selected as a photographing mode and the pop-up mode is set to the automatic mode, the following four modes can be selected as light emitting modes: "inhibit"; "forced light emission (leading curtain)"; "forced light emission red-eye (leading curtain)"; and "forced light emission trailing curtain". That is, by rotating the command dial 28 while pressing the switch button 42b as mentioned above, the characters or icons showing "inhibit", "forced light emission (leading curtain)", "forced light emission red-eye (leading curtain)", and "forced light emission trailing curtain" are displayed on the character LCD panel 26, EVF 30, or LCD 31 and switched.

When the S mode is selected as a photographing mode and the pop-up mode is set to the manual mode, the light emitting modes of "light emission (leading curtain)", "light emission red-eye (leading curtain)", and "light emission trailing curtain" can be selected.

Figure 8:
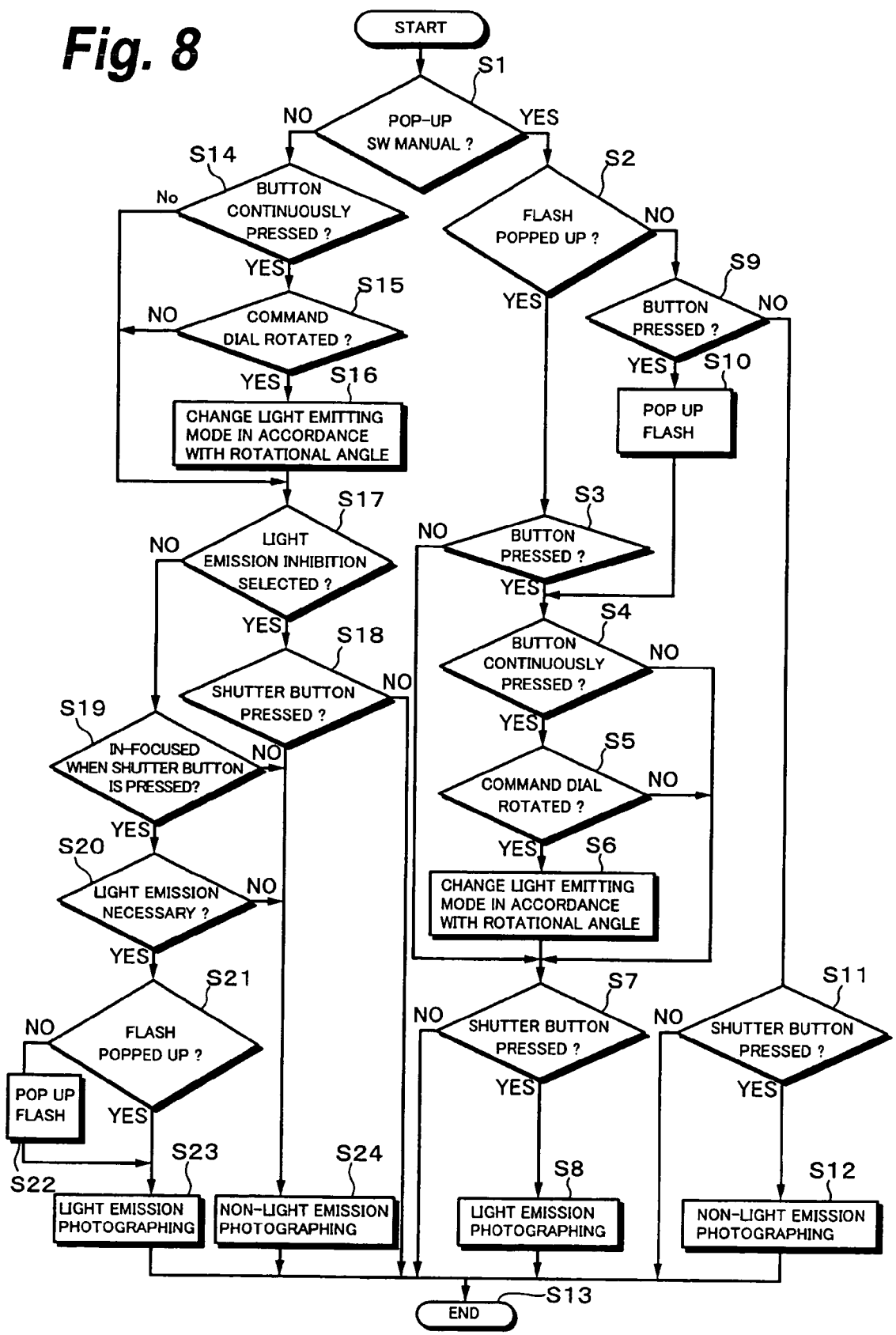
FIG. 8 is a flowchart showing a photographing process of the digital camera in the embodiment of the invention.

FIG. 8 shows an example of a flow for the photographing process of the digital camera 1 with the flash selecting switch 42.

In step S1, whether or not the slide switch 42a has been set to the manual side is discriminated. When the slide switch 42a is set to the manual side, it is regarded that the pop-up mode is the manual mode and the processing routine advances to step S2.

In step S2, whether or not the flash has been popped up is discriminated. If the flash has been popped up, step S3 follows. In step S3, whether or not the switch button 42b has been pressed is discriminated. When the switch button 42b is pressed in step S3, step S4 follows. If it is not pressed, step S7 follows.

If the flash is not popped up in step S2, step S9 follows. In step S9, whether or not the switch button 42b has been pressed is discriminated. When the switch button 42b is pressed, step S10 follows, the flash 22 is popped up, and further the processing routine advances to step S4. If the switch button 42b is not pressed in step S9, step S11 follows.

In step S11, whether or not the shutter button 24 has been pressed is discriminated. If the shutter button 24 is not pressed, the processing routine is finished (step S13). If the shutter button 24 has been pressed, since the flash 22 is located in the storing position, non-light emission photographing in which the flash 22 does not emit the light is executed (step S12) and the processing routine is finished (step S13).

Returning to step S4 again and explanation will be made. In step S4, whether or not the switch button 42b is continued to be pressed is discriminated. When the switch button 42b is not continued to be pressed, step S7 follows. When the switch button 42b is continued to be pressed, step S5 follows.

In step 5, whether or not the operation to rotate the command dial 28 has been executed is discriminated. If the command dial 28 is not rotated, step S7 follows. If the command dial 28 has been operated, step S6 follows.

In step S6, since the command dial 28 has been rotated while pressing the switch button 42b, the light emitting mode is changed in accordance with a change amount of a rotational angle of the command dial 28. The light emitting mode is decided and the processing routine advances to step S7.

In step S7, whether or not the shutter button 24 has been pressed is discriminated. If the shutter button 24 is not pressed, the processing routine is finished (step S13) without executing the photographing. If the shutter button 24 has been pressed, the light emission photographing is executed (step S8) and the processing routine is finished (step S13).

Subsequently, a flow for the photographing process when the slide switch 42a is set to the automatic side instead of the manual side, that is, in the case where the pop-up mode is set to the automatic mode in step S1 will be described.

If it is determined in step S1 that the pop-up mode is the automatic mode, step S14 follows. In step S14, whether or not the switch button 42b is continued to be pressed is discriminated. When the switch button 42b is not continued to be pressed, step S17 follows. When the switch button 42b is continued to be pressed, step S15 follows.

In step S15, whether or not the operation to rotate the command dial 28 has been executed is discriminated. If the command dial 28 is not rotated, step S17 follows. If the command dial 28 has been rotated, step S16 follows.

In step S16, the light emitting mode is changed in accordance with a change amount of a rotational angle of the command dial 28. The light emitting mode is decided and the processing routine advances to step S17.

In step S17, whether or not the light emitting mode has been set to "light emission inhibition" is discriminated. If the light emitting mode has been set to "light emission inhibition", step S18 follows. Whether or not the shutter button 24 has been pressed is discriminated. If the shutter button 24 has been pressed, step S24 follows. In step S24, since the light emission is inhibited, the non-light emission photographing is executed and the processing routine is finished (step S13). If the shutter button 24 is not pressed in step S18, the processing routine is finished without executing the photographing (step S13).

If the light emission is not inhibited in step S17, step S19 follows. In step S19, whether or not the camera has been in-focused when the shutter button 24 is pressed is discriminated. If the camera is not in-focused when the shutter button 24 is pressed, step S24 follows, the non-light emission photographing is executed and the processing routine is finished (step S13). If the camera has been in-focused when the shutter button 24 is pressed in step S19, step S20 follows.

In step S20, whether or not the flash 22 needs to emit the light in the photographing environment upon photographing is discriminated. If the light emission is unnecessary, step S24 follows, the non-light emission photographing is executed, and the processing routine is finished (step S13).

If it is determined in step S20 that the light emission is necessary, step S21 follows. In step S21, whether or not the flash 22 has been popped up is discriminated. If the flash 22 has been popped up, step S23 follows, the light emission photographing in which the flash 22 emits the light is executed, and the processing routine is finished (step S13). If the flash 22 is not popped up in step S21, step S22 follows and the flash 22 is popped up. Subsequently, step S23 follows, the light emission photographing is executed, and the processing routine is finished (step S13).

Figure 9:
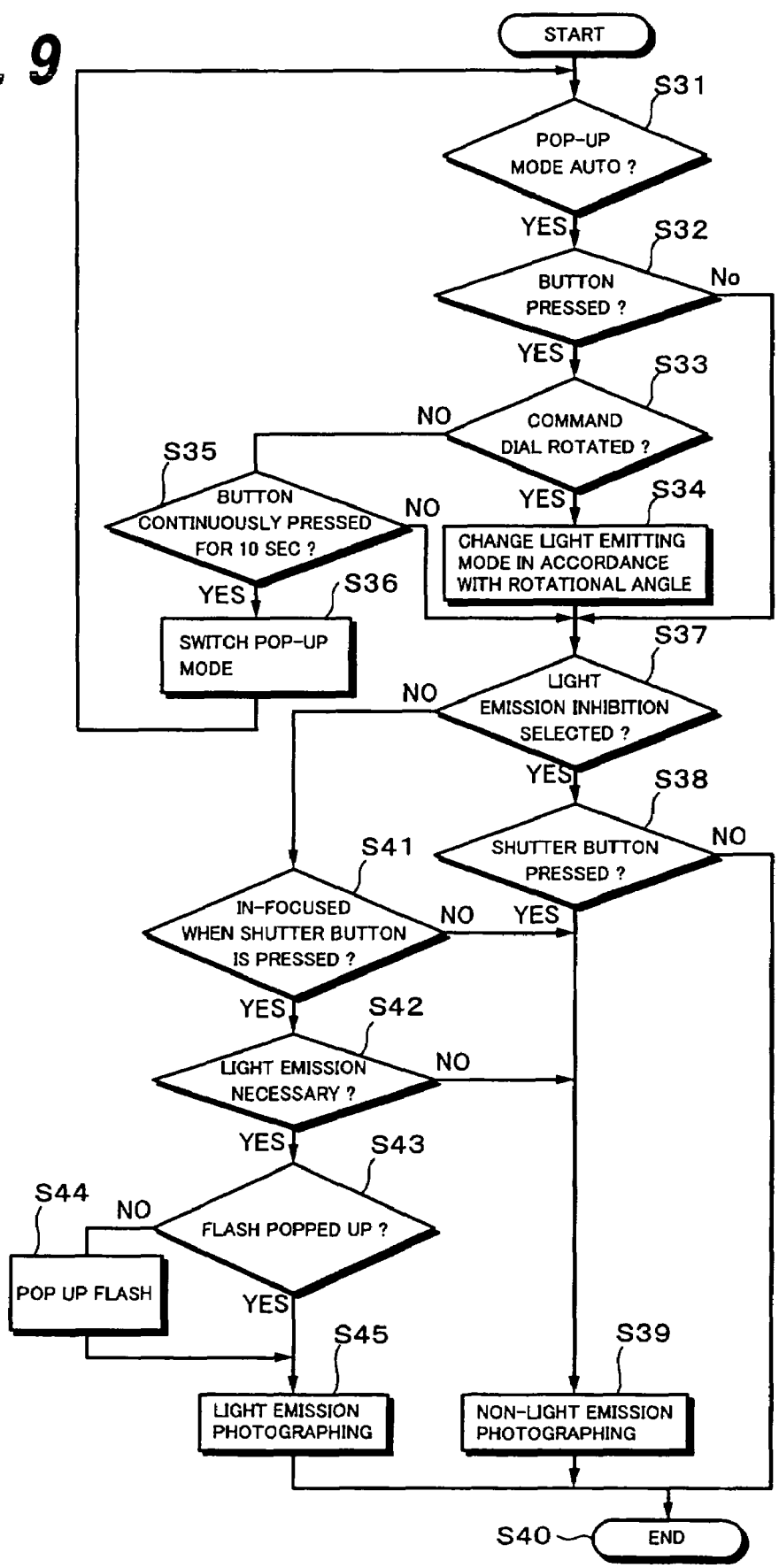
FIG. 9 is a flowchart showing another example of the photographing process of the digital camera in the embodiment.
Figure 10:
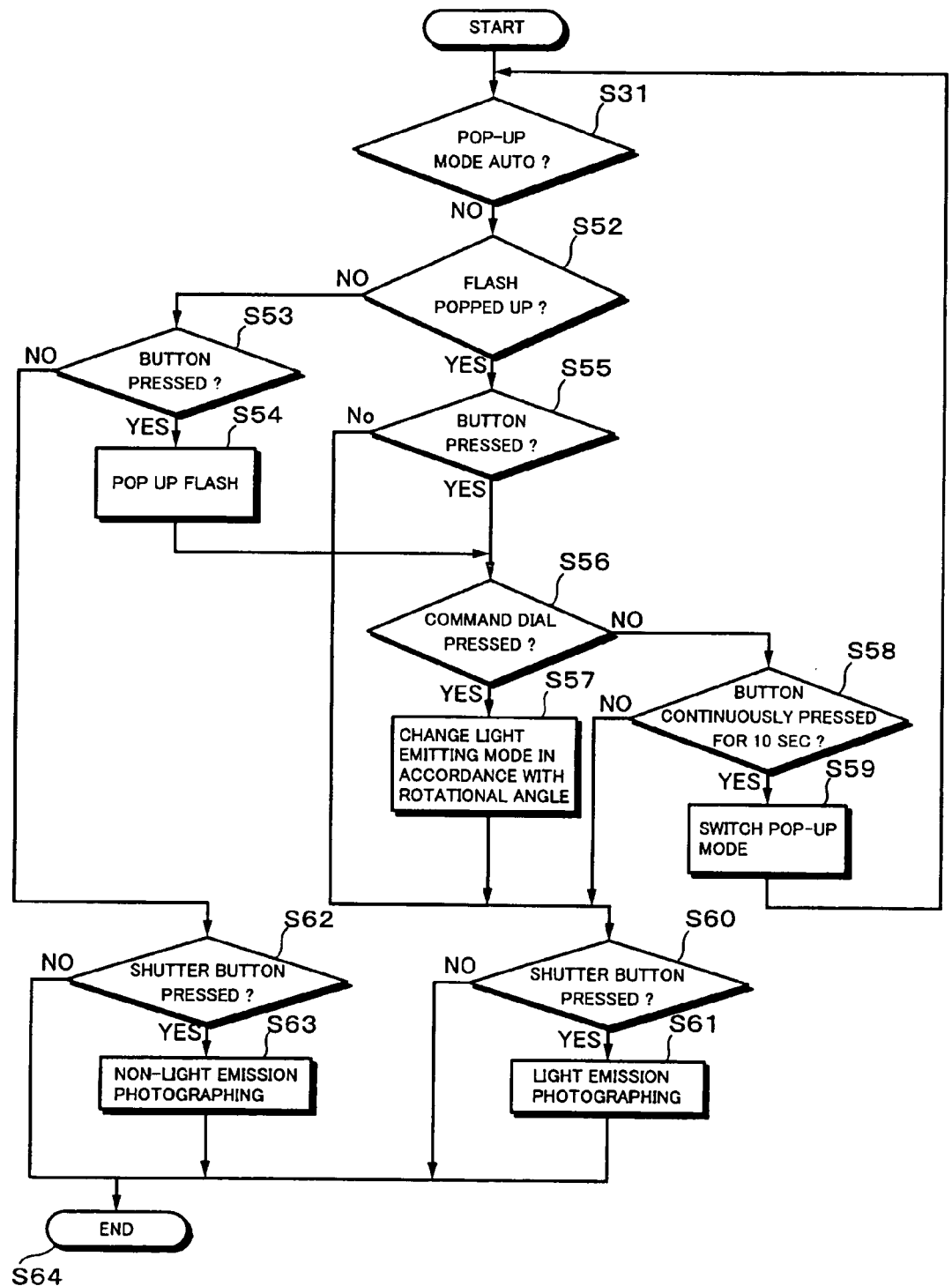
FIG. 10 is a flowchart showing another example of the photographing process of the digital camera in the embodiment.

FIGS. 9 and 10 show an example of a flow for the photographing process of the digital camera 1 with the switch button 45. For easy understanding of the explanation, it is assumed that FIG. 9 shows the flow for the photographing process in the case where the pop-up mode is the automatic mode and FIG. 10 shows the flow for the photographing process in the case where the pop-up mode is the manual mode.

In step S31, whether or not the pop-up mode has been set to the automatic mode is discriminated. The flow for the process in the case where it is determined in step S31 that the pop-up mode is the manual mode will be explained hereinafter with reference to FIG. 10.

If it is determined in step S31 that the pop-up mode is the automatic mode, step S32 follows. In step S32, whether or not the switch button 45 has been pressed is discriminated. If the switch button 45 is not pressed, step S37 follows.

In step S32, if the switch button 45 has been pressed, step S33 follows. In step S33, whether or not the command dial 28 has been operated is discriminated. If the command dial 28 is not operated, step S35 follows and whether or not the switch button 45 is continued to be pressed for ten seconds is discriminated. If the switch button 45 is not continued to be pressed, step S37 follows. If the switch button 45 is continued to be pressed, the pop-up mode is switched in step S36 and the processing routine is returned to step S31.

If the command dial 28 has been operated in step S33, step S34 follows. In step S34, the light emitting mode is changed in accordance with the change amount of the rotational angle of the command dial 28. When the light emitting mode is decided, the processing routine advances to step S37.

In step S37, whether or not the light emitting mode has been set to "light emission inhibition" is discriminated. If the light emitting mode has been set to "light emission inhibition", step S38 follows and whether or not the shutter button 24 has been pressed is discriminated. If the shutter button 24 has been pressed, step S39 follows, the non-light emission photographing is executed, and the processing routine is finished (step S40). If the shutter button 24 is not pressed in step S38, the processing routine is finished without executing the photographing (step S40).

If the light emitting mode is not set to "light emission inhibition" in step S37, step S41 follows. In step S41, whether or not the camera has been in-focused when the shutter button 24 is pressed is discriminated. If it is determined in step S41 that the camera is not in-focused, step S39 follows, the non-light emission photographing is executed, and the processing routine is finished (step S40).

If the camera has been in-focused in step S41, step S42 follows. In step S42, whether or not the flash 22 needs to emit the light is discriminated. If the light emission is unnecessary, step S39 follows, the non-light emission photographing is executed, and the processing routine is finished (step S40). If it is determined in step S42 that the flash 22 needs to emit the light, step S43 follows.

In step S43, whether or not the flash 22 has been popped up is discriminated. If the flash 22 has been popped up, step S45 follows, the light emission photographing is executed, and the processing routine is finished (step S40) If the flash 22 is not popped up in step S43, step S44 follows and the flash 22 is popped up. Subsequently, step S45 follows, the light emission photographing is executed, and the processing routine is finished (step S40).

The flow for the photographing process in the case where the pop-up mode is the manual mode in step S31 in FIG. 9 will now be described with reference to FIG. 10. If the pop-up mode is not the automatic mode, that is, it is the manual mode in step S31, the processing routine advances to step S52.

In step S52, whether or not the flash 22 has been popped up, in other words, whether or not the flash 22 is located in the projecting position is discriminated. If the flash 22 is not popped up, step S53 follows. In step S53, whether or not the switch button 45 has been pressed is discriminated. If the switch button 45 has been pressed, the flash 22 is popped up (step S54) and step S56 follows. If the switch button 45 is not pressed in step S53, step S62 follows.

In step S62, whether or not the shutter button 24 has been pressed is discriminated. If the shutter button 24 has been pressed, the non-light emission photographing is executed (step S63) and the processing routine is finished (step S64). If the shutter button 24 is not pressed in step S62, the processing routine is finished without executing the photographing (step S64).

Returning to step S52 again and explanation will be made. If the flash 22 has been popped up in step S52, the processing routine advances to step S55. In step S55, whether or not the switch button 45 has been pressed is discriminated. If the switch button 45 is not pressed, step S60 follows.

If the switch button 45 has been pressed in step S55, step S56 follows. In step S56, whether or not the command dial 28 has been rotated is discriminated. If the command dial 28 is not rotated, step S58 follows and whether or not the switch button 45 is continued to be pressed for 10 seconds is discriminated.

If the switch button 45 is continued to be pressed for 10 seconds in step S58, step S59 follows and the pop-up mode is switched. When the pop-up mode is switched, the processing routine is returned to step S31 and the pop-up mode is discriminated again. If the switch button 45 is not continued to be pressed for 10 seconds in step S58, step S60 follows.

When the command dial 28 is operated in step S56, step S57 follows. In step S57, since the command dial 28 has been operated while pressing the switch button 45, the light emitting mode is changed in accordance with the change amount of the rotational angle of the command dial 28. When the light emitting mode is decided, the processing routine advances to step S60.

In step S60, whether or not the shutter button 24 has been pressed is discriminated. If the shutter button 24 has been pressed, step S61 follows, the light emission photographing is executed and the processing routine is finished (step S64). If the shutter button 24 is not pressed, the processing routine is finished without executing the photographing (step S64).

Figure 11:
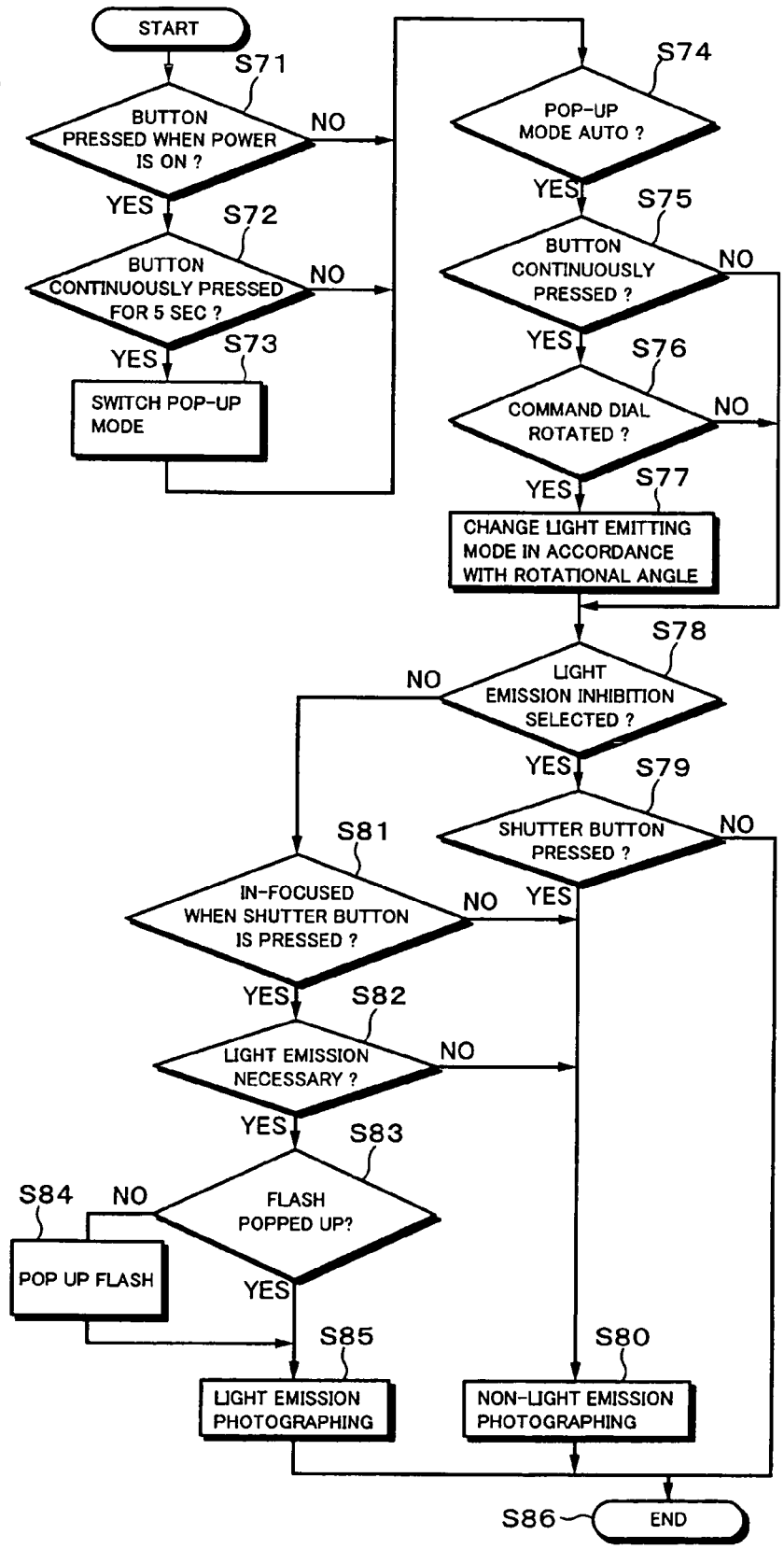
FIG. 11 is a flowchart showing still another example of the photographing process of the digital camera in the embodiment.
Figure 12:
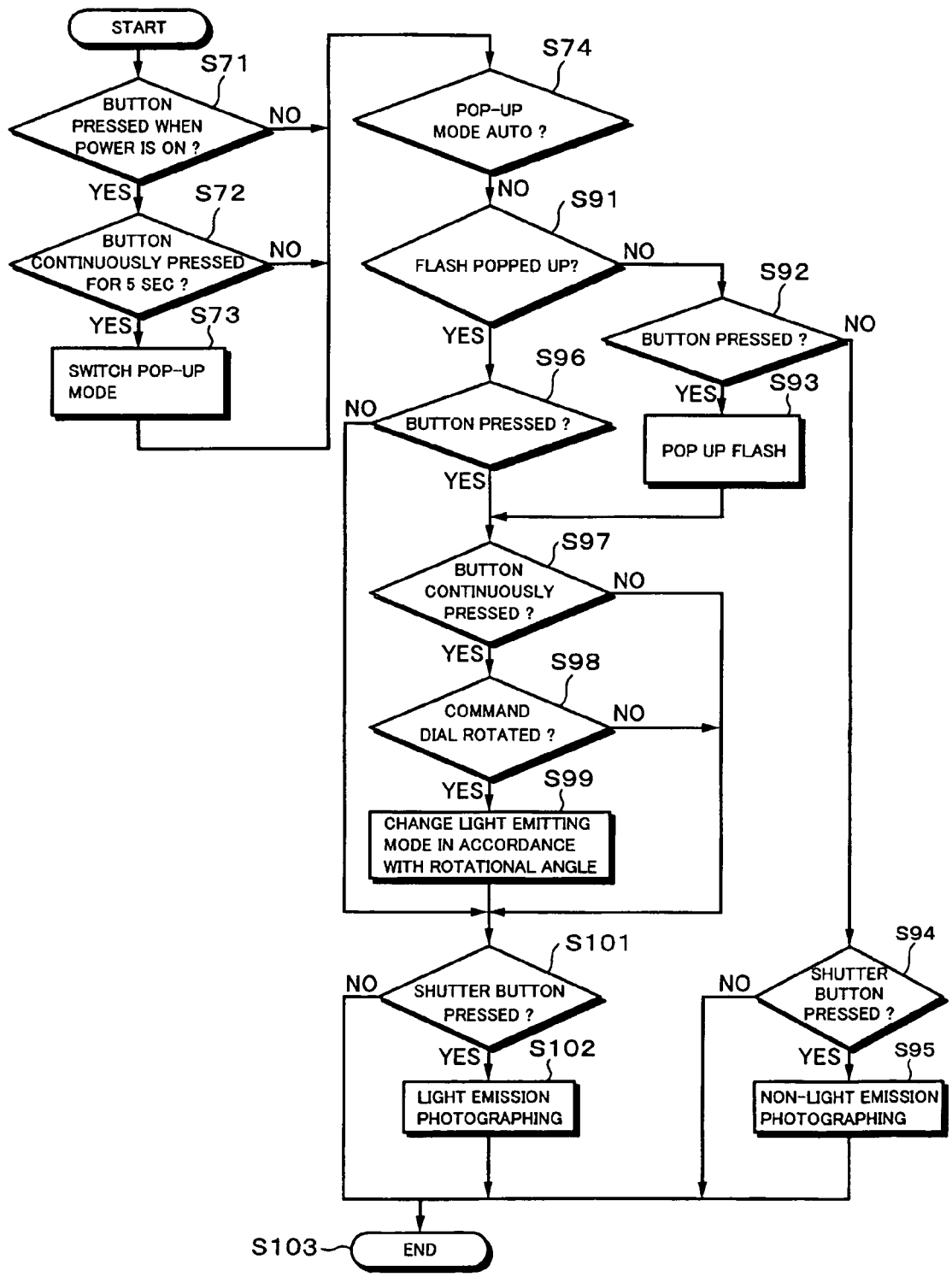
FIG. 12 is a flowchart showing still another example of the photographing process of the digital camera in the embodiment.

A modification of the photographing process of the digital camera 1 with the switch button 45 will now be described with reference to FIGS. 11 and 12.

In step S71, whether or not the switch button 45 has been pressed when the power source of the digital camera 1 is turned on is discriminated. If the switch button 45 is not pressed, step S74 follows. If the switch button 45 has been pressed, step S72 follows.

In step S72, whether or not the switch button 45 is continued to be pressed for 5 seconds is discriminated. If the switch button 45 is continued to be pressed, step S73 follows. If the switch button 45 is not continued to be pressed, step S74 follows.

In step S73, the pop-up mode is switched and step S74 follows. In step S74, whether or not the pop-up mode is the automatic mode is discriminated. If the pop-up mode is the automatic mode, step S75 follows. The case where the pop-up mode is not the automatic mode in step S74 will be described hereinafter with reference to FIG. 12.

In step S75, whether or not the switch button 45 is continued to be pressed is discriminated. If the switch button 45 is not continued to be pressed, step S78 follows. If the switch button 45 is continued to be pressed, step S76 follows.

In step S76, whether or not the operation to rotate the command dial 28 has been executed is discriminated. If the command dial 28 is not rotated, step S78 follows. If the command dial 28 has been operated, step S77 follows and the light emitting mode is changed in accordance with the change amount of the rotational angle of the command dial 28. The light emitting mode is decided and the processing routine advances to step S78.

In step S78, whether or not the light emitting mode has been set to "light emission inhibition" is discriminated. If the light emitting mode has been set to "light emission inhibition", step S79 follows. In step S79, whether or not the shutter button 24 has been pressed is discriminated. If the shutter button 24 is not pressed, step S86 follows and the processing routine is finished. If the shutter button 24 has been pressed, since the light emission is inhibited, the non-light emission photographing is executed (step S80) and the processing routine is finished (step S86).

If the light emitting mode is not set to "light emission inhibition" in step S78, step S81 follows. In step S81, whether or not the camera has been in-focused when the shutter button 24 is pressed is discriminated. If the camera is not in-focused, step S80 follows, the non-light emission photographing is executed, and the processing routine is finished (step S86). If the camera has been in-focused, step S82 follows.

In step S82, the necessity about the light emission is discriminated. If the light emission is unnecessary, step S80 follows, the non-light emission photographing is executed, and the processing routine is finished (step S86) If the light emission is necessary, step S83 follows.

In step S83, whether or not the flash 22 has been popped up is discriminated. If the flash 22 has been popped up, step S85 follows, the light emission photographing is executed, and the processing routine is finished (step S86). If the flash 22 is not popped up in step S83, step S84 follows.

In step S84, the flash 22 is popped up. Subsequently, step S85 follows, the light emission photographing is executed, and the processing routine is finished (step S86).

Explanation will be made with reference to FIG. 12. Since steps S71 to S74 are similar to the processes described in FIG. 11, their overlapped explanation is omitted. The case where the pop-up mode is not the automatic mode in step S74, that is, it is the manual mode will be explained hereinbelow.

If it is decided in step S74 that the pop-up mode is the manual mode, step S91 follows. In step S91, whether or not the flash 22 has been popped up, that is, whether or not it is located in the projecting position is discriminated. If the flash 22 is not popped up, step S92 follows.

In step S92, whether or not the switch button 45 has been pressed is discriminated. If the switch button 45 has been pressed, the flash 22 is popped up (step S93) and step S97 follows. When the switch button 45 is not pressed, step S94 follows.

In step S94, whether or not the shutter button 24 has been pressed is discriminated. If the shutter button 24 has been pressed, the non-light emission photographing is executed (step S95) and the processing routine is finished (step S103). If the shutter button 24 is not pressed in step S94, the processing routine is finished without executing the photographing (step S103).

Returning to step S91 again and explanation will be made. If the flash has been popped up in step S91, that is, if the flash is located in the projecting position, the processing routine advances to step S96.

In step S96, whether or not the switch button 45 has been pressed is discriminated. If the switch button 45 is not pressed, step S101 follows. If the switch button 45 has been pressed, step S97 follows. In step S97, whether or not the switch button 45 is continued to be pressed is discriminated.

If the switch button 45 is continued to be pressed, step S98 follows. If the switch button 45 is not continued to be pressed, step S101 follows.

In step S98, whether or not the operation to rotate the command dial 28 has been executed is discriminated. If the command dial 28 is not rotated, step S101 follows. If the command dial 28 has been operated, step S99 follows.

In step S99, the light emitting mode is switched in accordance with the change amount of the rotational angle of the command dial 28. The light emitting mode is decided and the processing routine advances to step S101.

In step S101, whether or not the shutter button 24 has been pressed is discriminated. If the shutter button 24 is not pressed, the processing routine is finished (step S103) without executing the photographing. If the shutter button 24 has been pressed, the light emission photographing is executed (step S102) and the processing routine is finished.

Although the change in the light emitting mode by the operation of the command dial 28 has been used in the description of the flow for the photographing process mentioned above, the setting of the light adjusting level by the rotating operation of the command dial 29 may be made.

Many variations and applications of the present invention are possible within the scope of the invention without departing from the spirit of the invention and the present invention is not limited to the foregoing embodiment. For example, it is possible to construct in such a manner that by operating the switch button 42b or 45 when the flash 22 is located in the projecting position, the operation to move the flash 22 from the projecting position to the storing position is instructed. The functions which are allocated to the command dials 28 and 29 may be exchanged.

The operating means such as switches, command dials, and the like which are provided for the digital camera 1 may be constructed as a touch panel. They may be constructed as a touch pad in which a selecting position is moved by sliding a finger on a pad and the selecting position is decided by pressing the pad.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
an image pickup lens, located at a front surface of the image pickup apparatus, for inputting light from an object;
a flash unit configured to be in a storing position or a projecting position;
an LCD panel, located at a back surface of the image pickup apparatus, for displaying the object and a menu on which various settings are made;
a shutter button, located at a right side of the image pickup apparatus, for executing the object image pickup;
a first operating unit that comprises a moveable switch for selecting between an automatic mode and a manual mode, wherein in the automatic mode, the image pickup apparatus is configured to automatically move the flash unit from the storing position to the projecting position; and
a second operating unit that comprises a flash pop-up button, which, when the manual mode has been selected by the first operating unit, permits a user to move the flash unit from the storing position to the projecting position, wherein:
the first operating unit is rotatable around the second operating unit, and the first operating unit and the second operating unit are located at a left side of the image pickup apparatus.

2. An apparatus according to claim 1, further comprising a third operating unit,
wherein setting a function of the flash unit can be made by operating the third operating unit while operating the second operating unit.

3. The image pickup apparatus according to claim 1, wherein the flash selection switch has two or more moveable parts.

4. The image pickup apparatus according to claim 3, wherein the flash selection switch comprises a button adjacent to a slide switch.

5. An image pickup apparatus comprising:
an image pickup lens, located at a front surface of the image pickup apparatus, for inputting light from an object;
a flash unit configured to be in a storing position or a projecting position;
an LCD panel, located at a back surface of the image pickup apparatus, for displaying the object and a menu on which various settings are made;
a shutter button, located at a right side of the image pickup apparatus, for executing the object image pickup;
wherein an automatic mode to automatically move the flash unit from the storing position to the projecting position or a manual mode to manually execute an operation can be set; and
a flash selection switch configured to permit a user to select between the automatic mode and the manual mode, wherein when the manual mode has been selected, the flash selection switch may be further selected to move the flash unit from the storing position to the projecting position, and when the automatic mode has been selected, the flash selection switch is prohibited from being used to move the flash unit from the storing position to the projecting position; wherein:
the flash selection switch is located at a left side of the image pickup apparatus.

6. An apparatus according to claim 5, further comprising a mode selection unit,
wherein setting a function of the flash unit can be made by operating the mode selection unit while operating the flash selection switch.

7. The apparatus according to claim 5, wherein the flash selection switch is a single unit having one moveable part.

8. The image pickup apparatus according to claim 7, wherein the single unit is a button.

9. An apparatus according to claim 7, wherein the selection of the automatic mode or the manual mode is performed by pressing the flash selection switch for a predetermined period of time.

10. The image pickup apparatus according to claim 5, wherein the flash selection switch has two or more moveable parts.

11. The image pickup apparatus according to claim 10, wherein the flash selection switch comprises a button adjacent to a slide switch.

12. A control method for an image pickup apparatus in which either an automatic mode to automatically determine whether or not to use a flash or a manual mode to manually select whether or not to use the flash, can be set, the control method comprising:
using an image pickup lens to input the light from an object, the image pickup lens located at a front surface of the image pickup apparatus;

using an LCD panel to display the object and a menu on which various settings are made, the LCD panel located at a back surface of the image pickup apparatus;

using a shutter button for executing the object image pickup, the shutter button located at a right side of the image pickup apparatus, using a first operating unit of a flash selection switch to select between the automatic mode and the manual mode; and if the manual mode has been selected, using a second operating unit of the flash selection switch to configure the image pickup apparatus to use a flash, wherein the first operating unit is adjacent to the second operating unit such that the first operating unit is rotatable around the second operating unit, the flash selection switch is located on a surface on a left side of the image pickup apparatus, and selection between the automatic mode and manual mode is made by moving the first operating unit in a direction parallel to the plane of the surface on which the flash selection switch is located.

13. A method according to claim 12, further comprising operating a mode selection unit while operating the flash selection switch to set a light emitting mode of the flash.

14. The method according to claim 12, wherein configuring the image pickup apparatus to use flash includes moving the flash unit from a storing position to a projecting position.

15. The method according to claim 12, wherein the flash selection switch includes using two or more moveable parts.

16. The method according to claim 15, wherein the two or more moveable parts include a button and a slide switch adjacent to the button.

* * * * *